Figure 1:
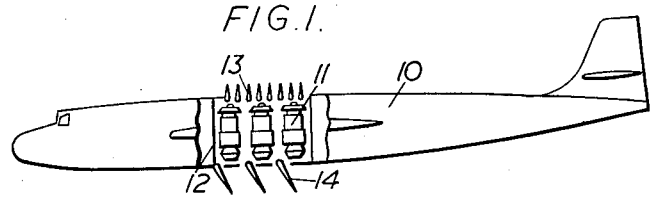

May 8, 1962  G. L. WILDE ETAL  3,033,493
VERTICAL TAKE-OFF AIRCRAFT
Filed Dec. 28, 1959  3 Sheets-Sheet 1

Inventors
Geoffrey Light Wilde
James Oswald Mortlock
By
Cushman, Darby & Cushman
Attorneys May 8, 1962  G. L. WILDE ETAL  3,033,493
VERTICAL TAKE-OFF AIRCRAFT Filed Dec. 28, 1959  3 Sheets-Sheet 2

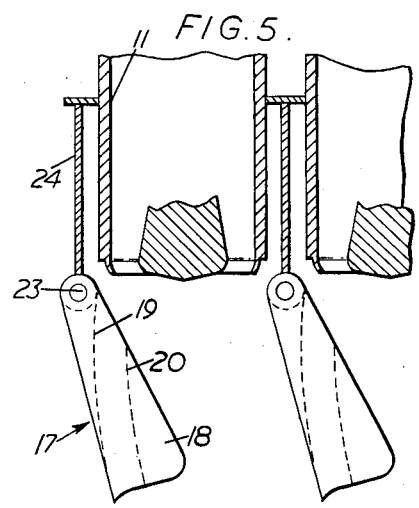
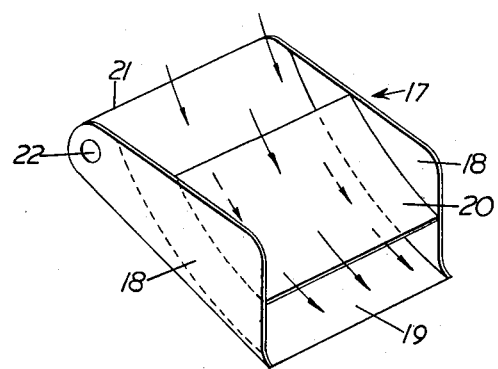

United States Patent Office 3,033,493
Patented May 8, 1962

3,033,493
VERTICAL TAKE-OFF AIRCRAFT
Geoffrey Light Wilde, Shottlegate, and James Oswald Mortlock, Derby, England, assignors to Rolls-Royce Limited, Derby, England, a company of Great Britain
Filed Dec. 28, 1959, Ser. No. 862,351
Claims priority, application Great Britain Jan. 8, 1959
4 Claims. (Cl. 244—23)

This invention concerns vertical take-off aircraft.

Vertical take-off aircraft are provided with engines (hereinafter referred to as lifting engines) which produce lift forces on the aircraft independently of lift forces which are generated aerodynamically by forward flight of the aircraft. The lifting engines are employed to effect take-off and descent of the aircraft, forward propulsion engines being employed to effect normal forward flight of the aircraft.

Thus, at take-off of the aircraft, the lifting engines are employed to lift the aircraft to a suitable altitude, after which the forward propulsion engines are brought into operation; when sufficient lift forces are generated aerodynamically by the forward flight of the aircraft the lifting engines are made inoperative.

Accordingly it may be desirable to arrange that when, on take-off, the aircraft has reached a suitable altitude, the propulsive gases discharged by the lifting engines shall be so directed as to provide a forward component of thrust on the aircraft so as to assist the forward propulsion engines. Similarly, immediately prior to descent, it may be desired that the propulsive gases discharged by the lifting engines shall be so directed as to provide a rearward component of thrust on the aircraft so as to reduce the forward speed of the aircraft, after which descent may be effected.

It is therefore the object of the present invention to provide a vertical take-off aircraft with means whereby the above-mentioned forward or rearward components of thrust may be produced.

According to the present invention in its broadest aspect there is provided a vertical take-off aircraft having at least one lifting engine, which is mounted to discharge propulsive gases downwardly, and at least one gas deflector member mounted below said engine, the gas deflector member being maintainable in a position in which it serves to deflect the downwardly directed propulsive gases away from the vertical so as to produce a forward or rearward component of thrust on said aircraft.

In one embodiment of the present invention there is provided a vertical take-off aircraft having at least one lifting engine which is arranged to discharge propulsive gases downwardly through an aperture in the aircraft structure, at least one flap member being provided which is movable into three positions, namely a closed position in which the aperture is sealed, a fully open position in which the propulsive gases may be vertically directed, and an inclined position in which the flap member serves to deflect the propulsive gases away from the vertical so as to produce a forward or rearward component of thrust on said aircraft.

Preferably there are a plurality of flap members corresponding respectively to a plurality of engines the arrangement being such that, when the flap members are in the closed position, they seal against each other and against the adjacent outer surfaces of the aircraft. Preferably there are at least four engines.

Means are preferably provided for hindering or preventing flow of propulsive gases transversely of the aircraft. Thus the said means may be constituted by webs provided on the flap member or members.

Figure 2:
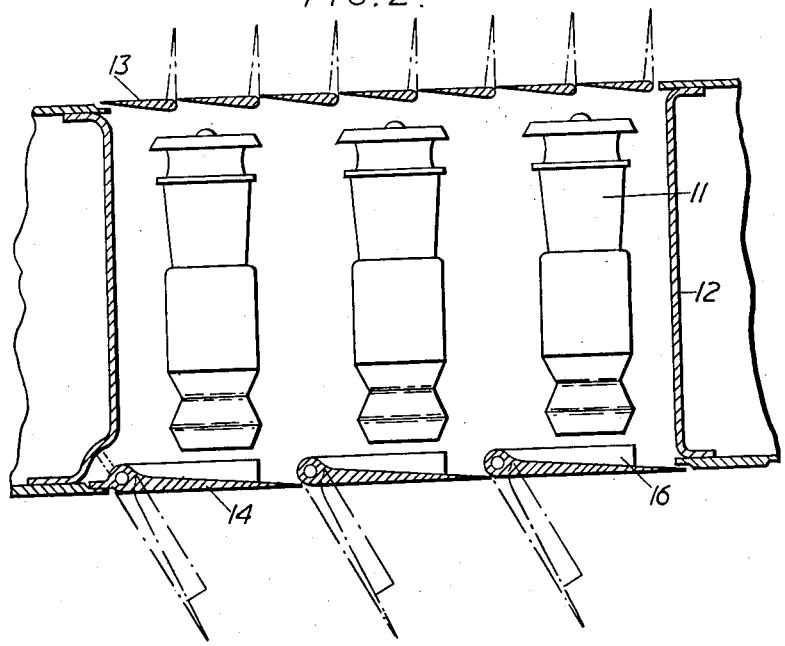
Figure 3:
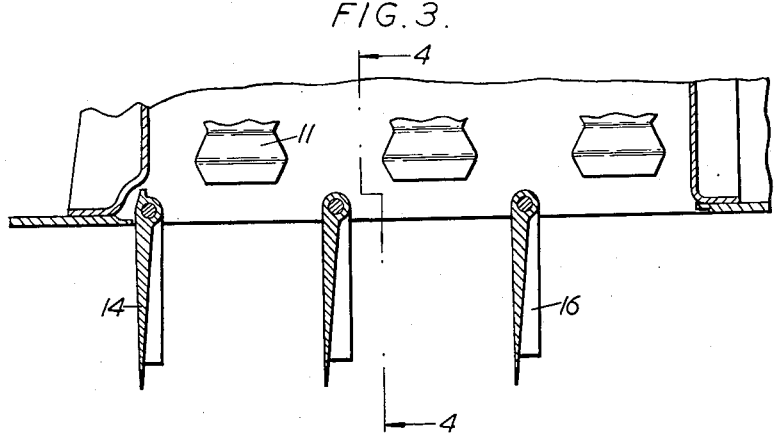
Figure 4:
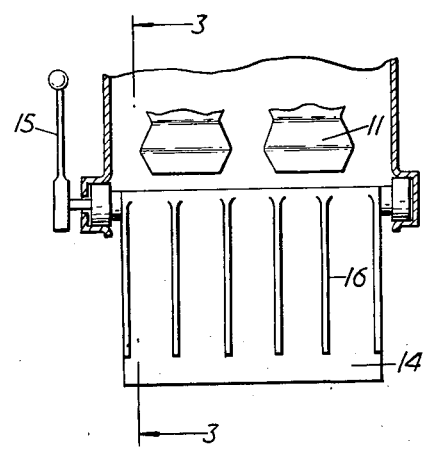

The invention is illustrated, merely by way of example in the accompanying drawings in which:

FIGURE 1 is an elevation of a vertical take-off aircraft according to the present invention, the structure of the aircraft being partly broken away to illustrate the lifting engines of the aircraft, FIGURE 2 is a sectional elevation of a part of the aircraft shown in FIGURE 1, FIGURE 3, which is a broken away section on the line 3—3 of FIGURE 4, illustrates the fully open position of the flap members which are disposed below the lifting engines of the aircraft according to the invention, FIGURE 4 is a broken away section on the line 4—4 of FIGURE 3, FIGURE 5 is a broken away sectional elevation showing part of a modified vertical take-off aircraft according to the invention, and FIGURE 6 is a perspective view of a flap member forming part of the construction of FIGURE 5.

Referring to FIGURES 1–4 of the drawings, a vertical take-off aircraft 10 is provided with six gas-turbine jet-reaction lifting engines 11 arranged in an engine bay 12. Alternatively the engines 11 could, if desired, be constituted by turbo-driven fans.

The upper end of the bay 12 is adapted to be opened and closed by pivotally mounted flap members 13 each of which is movable between the full line position shown in FIGURE 2, in which the flap members 13 serve collectively to close the upper end of the bay 12, and the dotted line position shown in FIGURE 2, in which the flap members 13 are fully open. In the full line, or closed position, the flap members 13 are disposed in the general aerodynamic profile of the aircraft and seal against each other and with the adjacent aircraft surfaces so as to prevent any ingress of air into the bay 12. The flap members 13 may also be disposed in forwardly inclined positions (not shown) so that, on forward flight of the aircraft, they serve to deflect ambient air into the intakes of the lifting engines 11, such deflection of the ambient air assisting starting of these engines, which would be tilted forward.

The lower end of the bay 12 is adapted to be opened and closed by three pivotally mounted flap members 14 which are adapted to be set in a closed position, a forwardly inclined position and any position between the closed and forwardly inclined position.

In the closed position, shown in full lines in FIGURE 2, the flap members 14 are disposed in the general aerodynamic profile of the aircraft and seal against each other and against the adjacent aircraft surfaces so as to prevent any ingress of air into the bay 12.

An inclined position of the flap members 14 is shown in dotted lines in FIGURE 2 in which the flap members 14 serve to deflect the propulsive gases from the lifting engines 11 away from the vertical so as to produce a forward component of thrust on the aircraft. It will readily be appreciated that the flap members 14 may, if so desired, be inclined forward so that they deflect the propulsive gases forwardly whereby they produce a rearward component of thrust on the aircraft. The rear engine gas flow, in this case, does not contribute to the "braking" effect.

In the fully open position shown in FIGURES 3 and 4, the flap members 14 are vertically disposed so that the propulsive gases from the engines 11 will be vertically downwardly directed.

It is preferably arranged that the intake flap members 13 and the exhaust flap members 14 are progressively opened or closed at a rate dependent upon the forward speed of the aircraft, for example the arrangement may be that the flaps will be only partially open when the forward speed of the aircraft is relatively high, the ram effect on the air being sufficient for operation of the lifting engines; the flaps will, however, be vertical when the forward speed of the aircraft falls to approximately zero, when there will be no ram effect to force the air through the engine intakes.

The flap member 14 illustrated in FIGURE 4 is shown as being rotatable by a control lever 15 so that it can be disposed in each of the positions referred to above. The showing of the control lever 15 is, of course, purely diagrammatic. In practice it could be arranged that all the flap members 14 are moved by means of a common control operable from the pilot's cabin, such control comprising means for maintaining the flap members 14 in a selected position.

Each flap member 14 is provided with a plurality of longitudinally extending, spaced apart webs 16. The webs 16, in addition to strengthening the flap members, serve to inhibit cross flow of propulsive gases from the engines 11, that is to say flow of the propulsive gases transversely of the aircraft. It is desirable to prevent such cross flows since these can cause yawing of the aircraft.

Since both the flap members 13 and the flap members 14, when in their closed positions, seal one with another and with the adjacent aircraft surfaces, it is unnecessary to provide additional members to close the upper and lower ends of the bay 12.

In FIGURES 5 and 6 there is shown an alternative construction in which the flap members 14 are replaced by flap members 17. The flap members 17 have spaced side walls 18 between which extend an inner curved deflector 19 and an outer curved deflector 20, the deflectors 19, 20 being spaced from and parallel to each other.

One of the ends 21 of each flap member 17 is smoothly curved, the deflector 19 constituting a smooth continuation of the end 21. The end 21 has a hole 22 therethrough which receives a pivot pin 23, the pin 23 being carried by a bar 24 mounted (by means not shown) within the bay 12.

The flap members 17 are movable in the same way as the flap members 14 so as to deflect the propulsive gases from the lifting engines 11. The provision of the two spaced, curved deflectors 19, 20 assists in the smooth deflection of the propulsive gases into the desired direction.

We claim:

1. In a combination of a vertical takeoff aircraft of the type having a substantially vertically extending aperture in the structure thereof and at least two lifting engines arranged in the aperture spaced from one another longitudinally of the aircraft for discharging propulsive gases downwardly through the aperture outwardly from the discharge end thereof, the improvement comprising: a single flap member for each of said engines, said flap members being pivotally mounted to the aircraft structure adjacent the discharge end of the aperture on longitudinally spaced axes transverse of the same, the pivotal axes of said flap members being located immediately forwardly of the paths of the propulsive gases discharged from their respective engines, each of said flap members being pivotable between three positions, a closed position, an inclined position and a fully open position, the flap members when they are in their closed positions sealing the aperture, and when they are in their inclined and fully open positions, extending with their free edges beneath the aircraft structure, each flap member when in the inclined position extending across the path of the propulsive gases discharged from the respective engine and deflecting those gases away from a vertical, and the flap members when they are in their fully open positions directing the propulsive gases from the respective engines vertically beneath the aircraft; and means operatively associated with each said flap member when in the inclined and fully open position to confine flow of propulsive gases being discharged from the aperture from traveling in a direction transverse of the aircraft at least until the gases are away from the aircraft structure and past the free end of the flap member, said last-mentioned means including a plurality of webs spaced across the width of the flap member and extending in a direction parallel to a longitudinal axis of the aircraft.

2. The improvement defined in claim 1 including a plurality of closure members pivotally mounted on the aircraft structure adjacent the inlet end of said aperture, said closures being movable between a closed position in which they collectively close the inlet end of the aperture and an open position for deflecting ambient air into the aperture.

3. The improvement defined in claim 1 including a plurality of closure members pivotally mounted on the aircraft structure adjacent the inlet end of said aperture, said closures being movable between a closed position in which they collectively close the inlet end of the aperture and an open position for deflecting ambient air into the aperture.

4. In a combination of a vertical take-off aircraft of the type having a substantially vertically extending aperture in the structure thereof and at least two lifting engines arranged in the aperture spaced from one another longitudinally of the aircraft for discharging propulsive gases downwardly through the aperture and outwardly from the discharge end thereof, the improvement comprising: a single flap member for each of said engines, said flap members being pivotally mounted to the aircraft structure adjacent the discharge end of the aperture on longitudinally spaced axes transverse of the same, the pivotal axes of said flap members being located immediately forwardly of the paths of the propulsive gases discharged from their respective engines, each of said flap members being pivotable between three positions, a closed position, an inclined position and a fully open position, the flap members when they are in their closed positions sealing the aperture, and when they are in their inclined and fully open positions, extending with their free edges beneath the aircraft structure, each flap member when in the inclined position extending across the path of the propulsive gases discharged from the respective engine and deflecting those gases away from a vertical, and the flap members when they are in their fully open positions directing the propulsive gases from the respective engines vertically beneath the aircraft; and means mounted on each flap member for confining the flow of propulsive gases being discharged from the aperture from traveling in a direction transverse of the aircraft at least until the gases are away from the aircraft structure and past the free ends of the flap members, said last-mentioned means including a plurality of webs integrally carried by each of said flap members and spaced across the width of the same, said webs extending in a direction parallel to a longitudinal axis of the aircraft.

References Cited in the file of this patent

UNITED STATES PATENTS

| 2,420,323 | Meyer et al. | May 13, 1947 |
| 2,930,544 | Howell | Mar. 29, 1960 |

FOREIGN PATENTS

| 530,577 | Canada | Sept. 18, 1956 |